United States Patent
Shemer et al.

(10) Patent No.: US 11,275,658 B2
(45) Date of Patent: Mar. 15, 2022

(54) RESCUE PACKAGE FOR UNCONTROLLABLE SPLITTERS

(71) Applicant: EMC IP Holding Company LLC, Hopkinton, MA (US)

(72) Inventors: Jehuda Shemer, Kfar Saba (IL); Saar Cohen, Moshav Mishmeret (IL); Kfir Wolfson, Beer Sheva (IL); Itay Azaria, Dimona (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 31 days.

(21) Appl. No.: 16/802,795

(22) Filed: Feb. 27, 2020

(65) Prior Publication Data

US 2021/0271574 A1     Sep. 2, 2021

(51) Int. Cl.
*G06F 11/00* (2006.01)
*G06F 11/14* (2006.01)
*G06F 11/20* (2006.01)
*G06F 16/27* (2019.01)

(52) U.S. Cl.
CPC ...... *G06F 11/1471* (2013.01); *G06F 11/1464* (2013.01); *G06F 11/2056* (2013.01); *G06F 11/2064* (2013.01); *G06F 16/273* (2019.01); *G06F 2201/80* (2013.01); *G06F 2201/82* (2013.01); *G06F 2201/835* (2013.01)

(58) Field of Classification Search
CPC ............ G06F 11/1464; G06F 11/1471; G06F 11/2056; G06F 11/2064
See application file for complete search history.

(56) References Cited

U.S. PATENT DOCUMENTS

| | | | | |
|---|---|---|---|---|
| 8,332,687 B1 * | 12/2012 | Natanzon | ............ | G06F 11/2074 714/6.3 |
| 2002/0040449 A1 * | 4/2002 | Nakano | ............... | G06F 11/1612 714/6.3 |
| 2010/0049930 A1 * | 2/2010 | Pershin | ............... | G06F 11/1451 711/162 |
| 2011/0295804 A1 * | 12/2011 | Erofeev | .............. | G06F 11/1435 707/634 |
| 2016/0371007 A1 * | 12/2016 | Shani | .................. | G06F 11/1464 |
| 2017/0235652 A1 * | 8/2017 | Natanzon | ............ | G06F 11/1451 714/6.3 |
| 2017/0316030 A1 * | 11/2017 | Shetty | ................. | G06F 11/2076 |

* cited by examiner

*Primary Examiner* — Michael Maskulinski
(74) *Attorney, Agent, or Firm* — Workman Nydegger

(57) ABSTRACT

A data protection system configured to replicate data may generate rescue packages that allow the system to recover when communication between a splitter or source of the production data being replicated and an appliance that stores the replicated data is disrupted. The rescue package is stored on a datastore and is then retrieved by the data protection system or another splitter. After processing the rescue package, which may contain IOs that the data protection is unaware of due to the communication disruption, replication may resume normally.

18 Claims, 4 Drawing Sheets

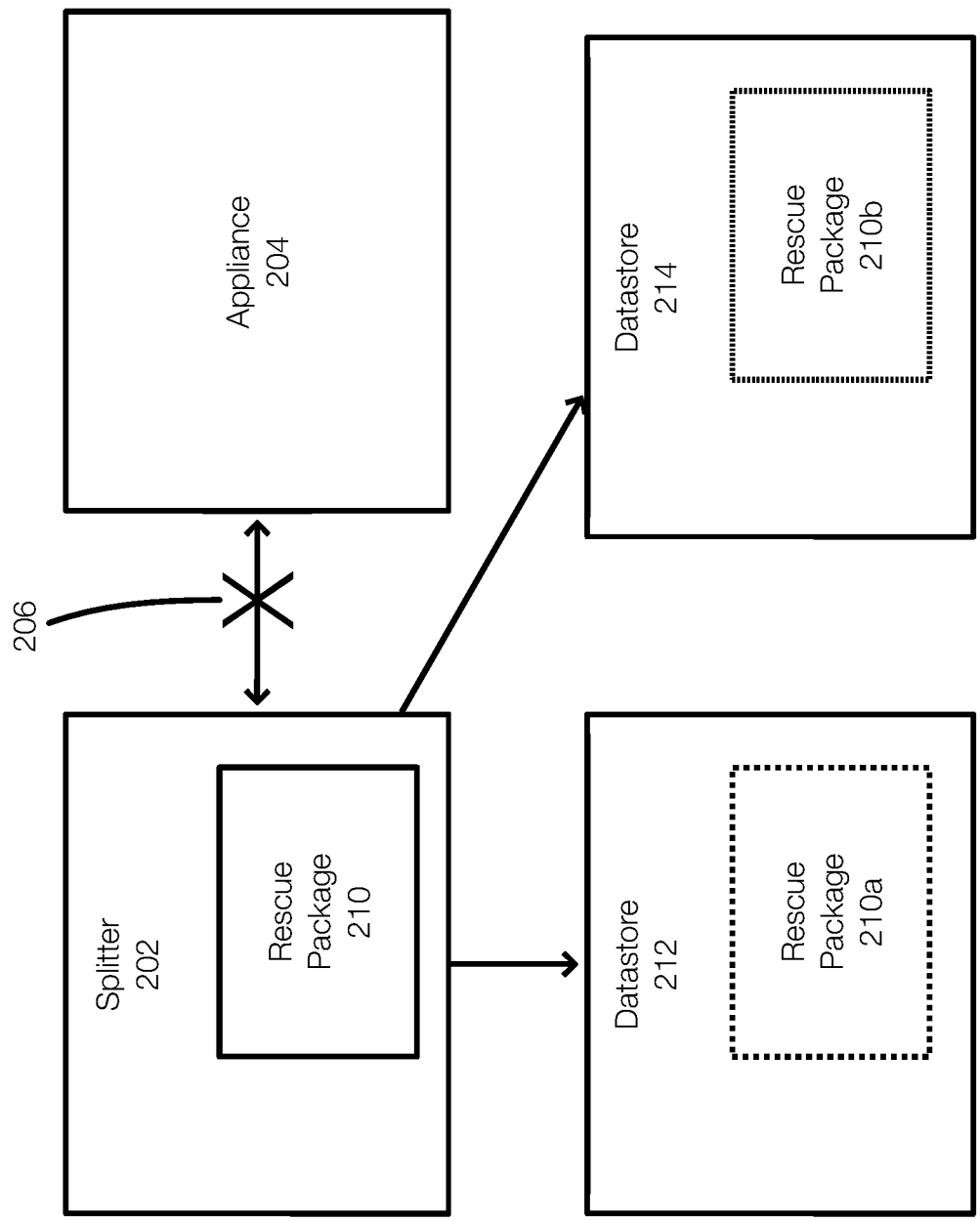

RESCUE PACKAGE FOR UNCONTROLLABLE SPLITTERS

FIELD OF THE INVENTION

Embodiments of the present invention generally relate to data protection and data protection operations. More particularly, at least some embodiments of the invention relate to systems, hardware, software, computer-readable media, and methods for performing data protection operations including replicating data and replicating data when connections or communications are lost or temporarily unavailable.

BACKGROUND

Generally, replication is a process in which input/outputs (IOs) such as writes are detected and sent to another device in addition to their intended destination. This process generates replicated data or backups that are substantially the same as the production data. However, the ability to replicate data with a very low recovery point objective (RPO) can be complicated when the target of the replicated data is unable to communicate with the source of the replicated data.

More specifically, replication becomes complicated when the source of the replicated production data is unable to communicate with the target of the replicated data. This problem becomes larger as the time during which communication is lost rises.

The process of replicating data is further complicated by the configuration of modern computing systems. In addition to facing problems when communication is lost, additional problems arise when the configuration of the source data changes. For example, virtual machines may move from one host to another host. When this occurs and when communication is lost, the ability to resume replication once communication is reestablished is difficult.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2 discloses an example of a rescue package that is generated when communication disruptions are detected.

DETAILED DESCRIPTION OF SOME EXAMPLE EMBODIMENTS

Figure 1A:
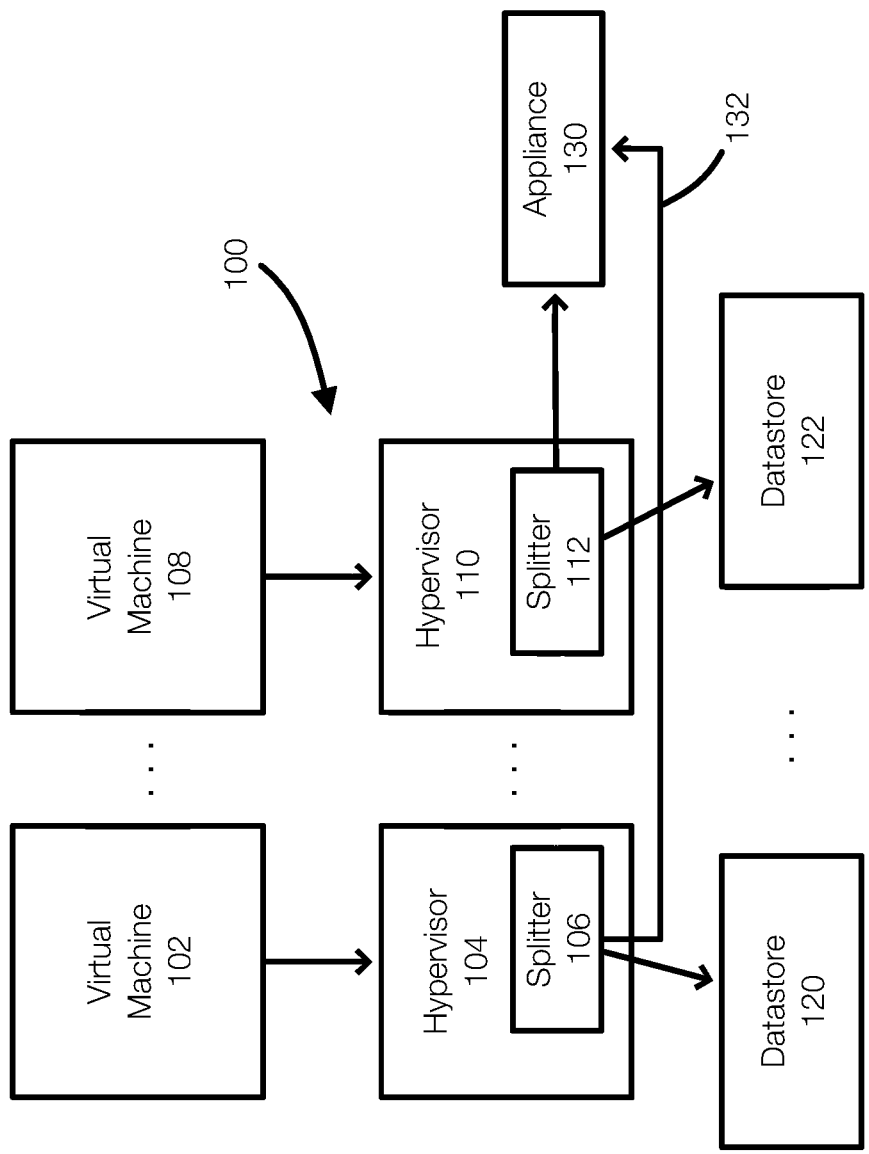
FIG. 1A discloses an example of a data protection system that performs data protection operations including replication operations in a computing system.

Embodiments of the present invention generally relate to data protection and data protection operations. More particularly, at least some embodiments of the invention relate to systems, hardware, software, computer-readable media, and methods for performing data protection operations including backup operations, restore operations, replication operations, disaster recovery and business continuity operations, or the like or combination thereof.

In general, example embodiments of the invention relate to replication operations. Any point in time (PiT) replication systems, including PiT replication for virtual machines (RP4VMs), often employ splitters. The splitters are configured to capture Input/Output (IOs) to a datastore (e.g., virtual machine IOs) and send a copy of the captured IOs to a replication appliance. The splitter and the appliance are part of a data protection system and cooperate to replicate IOs in a production system. In one example, a replication appliance, which may be local and/or cloud-based and which may be virtual, communicates with the splitter or with the production system using a connection or communication channel such as TCP/IP (Transmission Control Protocol/Internet Protocol).

Embodiments of the invention perform replication operations or, more generally, data protection operations, that are configured to handle communication disruptions. While there may be redundant communication options, handling communication disruptions between a splitter and an appliance ensure that the impact of the communication disruptions on production operations including production virtual machine operations are reduced or minimized. More specifically, embodiments of the invention handle communication disruptions such that production operations are not affected or such that the impact of the communication disruption on production operations is reduced.

The replication operation includes communications between one or more appliances and one or more splitters. A disruption of the communication between an appliance and a splitter can result in a situation where the splitter is uncontrollable or unreachable. A computing system may include controllable splitters (e.g., splitters that can communicate with an appliance) and uncontrollable splitters (e.g., splitters than cannot communicate with an appliance).

Conventionally, the consequence of an uncontrollable splitter is that a full sweep of the production volumes associated with the uncontrollable splitter must be performed due to the loss of tracking information. A full sweep, in one example, refers to a process in which an entire production volume is synchronized with a corresponding replica. Embodiments of the invention aim to avoid full sweeps. An uncontrollable splitter may result in inconsistent data because the appliance may not be aware of at least some IOs. As a result, the time-consuming task of synchronizing the production volumes in their entirety must be performed. Embodiments of the invention help avoid these situations.

More specifically, embodiments of the invention relate to a rescue package, that may be generated by an uncontrollable splitter. The rescue package stores enough information to recover from a communication disruption. The rescue package allows costly full sweeps to be avoided and allows issues such as missing IOs associated with the replication process to be resolved. After an appliance processes the rescue package(s) generated by the uncontrollable splitter, normal replication operations may be resumed. This is less costly than performing a full sweep of the affected volumes.

FIG. 1A illustrates an example of a production system that is replicated by a data protection system. FIG. 1A also illustrates a situation where no communication disruptions are present. The production system 100 includes a plurality of virtual machines, represented by virtual machines 102 and 108. The computing system 100 may be organized to include one or more consistency groups. In FIG. 1A, virtual machines 102 and 108 are operating on, respectively, hypervisors 104 and 110 (e.g., ESX). The virtual machines 102 and 108 are associated with datastores 120 and 122. IOs from the virtual machines are intercepted by the splitters 106 and 112.

More specifically and by way of example, the virtual machine 102 may generate IOs that are to be stored in the datastore 120 using, for example, write commands. These IOs are intercepted by the splitter 106 and replicated to an appliance 130, which is an example of a data protection system (e.g., RP4VM, DataDomain Recovery Point).

The splitter 106 is illustrated in the hypervisor 104. However, the splitter 106 may be in the virtual machine 102 or any other part of the infrastructure as long as the splitter 106 is in the IO path associated with the virtual machine 102. In this example, the data being replicated is transmitted over a connection 132 such as an IP connection. The connection 132 may also be used for both data and control purposes. The appliance 130 may obtain the status of the splitter 106 and send replication commands to the splitter 106 using the connection 132. The splitter 112 may communicate over a similar channel or connection.

Figure 1B:
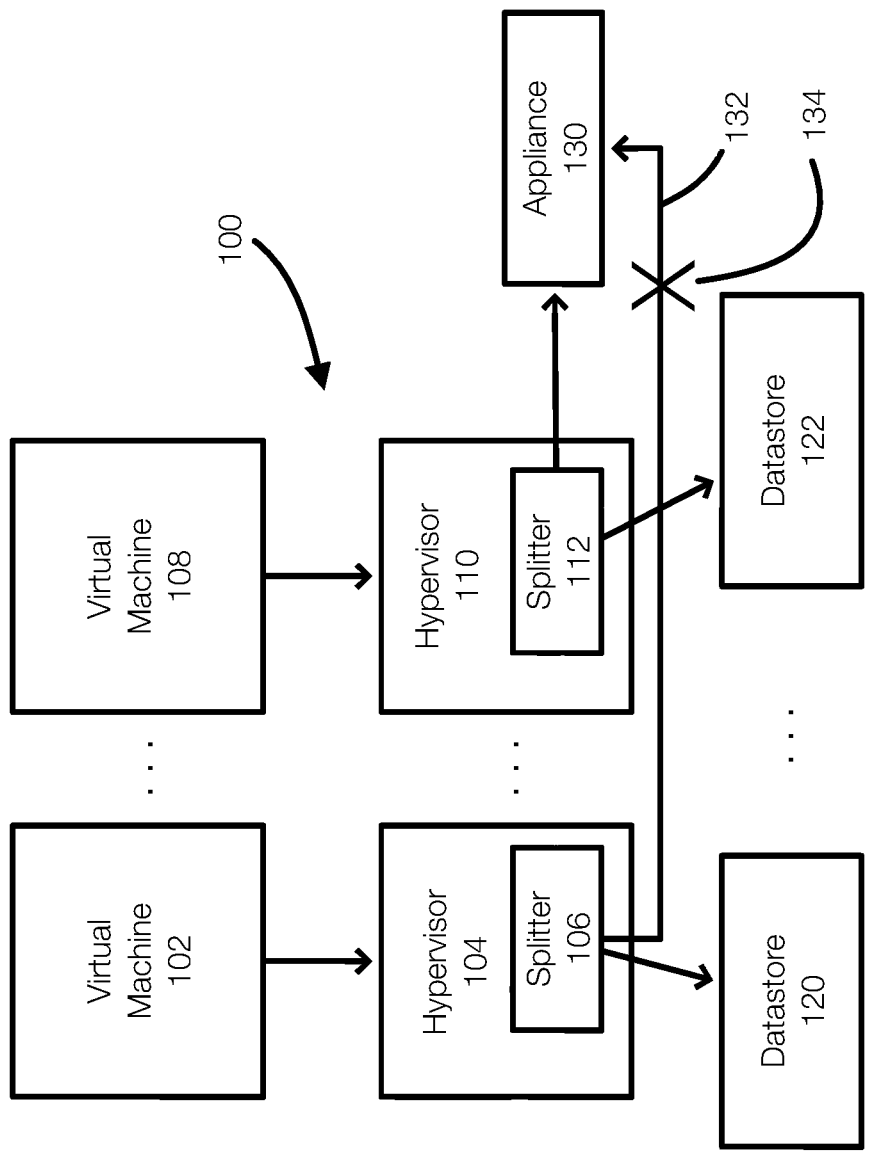
FIG. 1B discloses the computing system of FIG. 1A when communication is disrupted.

FIG. 1B illustrates a communication disruption that has occurred or is present in the computing system 100 or between the splitter 106 and the appliance 130. As previously stated, the appliance 130 is associated with control path channels (e.g., 132) that may be used to control the splitter 106 and obtain splitter status. These commands include, by way of example only, instructions to protect new volumes, unprotect volumes, change replication parameters, or the like or combination thereof.

In the data protection (e.g., PiT replication system) shown in FIGS. 1A and 1B, it is desirable to track every IO as the IO comes in and replicate that IO to the appliance 130. As a result, the appliance 130 needs to know as soon as possible if there is a loss of communication with the splitter 106. When a loss of communication or other communication disruption 134 is detected, the appliance 130 understands that the appliance 130 does not or may not hold the latest information. In other words, the appliance 130 is not sure whether or not all of the IOs have been received and accounted for. Consequently, the data stored by the appliance 130, for example, in an associated storage, may be inconsistent and the ability to rely on the replicated data is reduced. Further, any PiT image generated from the data stored by the appliance 130 or recovered from the data associated with the time of the communication disruption may be considered inconsistent. However, embodiments of the invention allow the inconsistent data to be brought to a consistent state.

Once the disruption 134 is detected, the splitter 106 is marked as unreachable or uncontrollable. Thus, the splitter 106 becomes an uncontrollable splitter. The splitter 112, on the other hand, may be a controllable splitter. As a result, all virtual machines/consistency groups that have anything to do with the uncontrollable splitter 106 are suspected to be or treated as inconsistent until the disruption 134 is resolved. Consequently, all devices, virtual machines or other components that are associated with or impacted by the splitter 106 may be in an error state until the error is resolved.

Once the disruption 134 is detected, a decision about how to proceed is made after some period of time. In one example, the uncontrollable splitter 106 begins to prepare for a recovery process after a specified time period. The appliance 130 may be configured to similarly begin a recovery process after the specified time has elapsed. Simply waiting on the splitter to recover will likely require a full sweep of the volumes associated with the splitter as previously stated. Embodiments of the invention help avoid full sweeps as previously stated.

When a communication disruption occurs, there are several possible outcomes. In one example, the volume or datastore 120 and the replicated data may be consistent notwithstanding the disruption 134. For example, if no IOs occurred during the disruption 134, then the replicated data is consistent. Alternatively, the virtual machine 102 has moved to a different splitter or the datastore 120 is associated with a different splitter. However, the appliance 130 may be unaware of these circumstances due to the disruption 134 and, in one example, assumes that there is an inconsistency. In some embodiments, the recovery process is performed to ensure that the data is consistent even though there may be situations where data inconsistency is not present. Thus, when the disruption 134 is detected, the appliance 130 typically assumes that the data is inconsistent.

The splitter 106 may also perform actions that facilitate recovery from the communication disruption. The splitter 106 may maintain or create data structures (rescue packages) that store information about the entities being protected. The rescue packages may include identifiers (IDs), protection modes, or the like.

More specifically, a rescue package may hold or store at least the following information:

The stored information in the rescue package may include a dirty bit. When set, the dirty bit indicates that the volume is dirty or that there are IOs that the appliance 130 does not know about due to some error/disruption. In other words, if the appliance 130 is not aware of some IOs, then the volume or datastore 120 is dirty and a dirty bit is included in the rescue package.

The stored information in the rescue package may also include an active bit. The active bit identifies whether an entity is "active" on this splitter (e.g., a PDD bit in RP4VMs). For example, if the virtual machine is currently active on or protected by the uncontrollable splitter, the active bit is set. The virtual machine could have moved to another hypervisor and older data is available for that virtual machine. In other words, the data structure may store information identifying whether any associated entity such as a virtual machine or datastore is active with regard to the splitter associated with the disruption.

The rescue package may also store IO tracking data or a backlog. The backlog may contain metadata and/or bitmaps that track the dirty areas (e.g., areas affected by IOs that the appliance is not aware of) on the volume in case the IOs cannot be sent to the appliance 130. Once communications resume and the disruption 134 is resolved, the backlog is collected by the appliance, the marked or dirty areas are resynched, and normal replication can resume.

If the backlog of the splitter is lost, this typically results in a full sweep at least because there is no information about whether IOs are missing or whether the data is consistent. This may happen, for example, if the splitter crashes or reboots. In some examples, the backlog is not stored persistently at least because it may add substantial latency. The dirty and active bits, however, may not change frequently and may be stored persistently.

The dirty bit and the active bit may be sent to the appliance 130 as part of the splitter's status information during, for example, error handling. If the appliance 130 notes that the volume is dirty, the backlog information from the splitter 106 is requested in order to resynchronize. In one example, the generating of the rescue package is performed when the disruption is more significant or lasts for some period of time.

More specifically, the disruption 134 often results in replication errors that need to be resolved. The disruption 134 indicates that the appliance 130 lacks information and does not know if IOs have been missed. Further, replication can only resume once information from the splitter 106 has been retrieved and processed.

When communications resume, the splitter 106 may send information to the appliance 130. This allows the data to be resynched and normal replication operations may resume. However, until the control channel was regained, replication could not proceed and the appliance 130 has no information on the splitter 106 of on data or IOs that may have been missed. In some instances, the virtual machine may have moved to another splitter by the time communication is resolved. Thus, the virtual machine 102 may no longer be on the splitter 106 and can be replicated normally. However, it is necessary to know if anything was missed with respect to the uncontrollable splitter 106 or during the time of the disruption 134.

In one example, even assuming that redundant communication channels have been exploited, embodiments of the invention ensure that the splitter's data can be delivered to the appliance 130. This is achieved, in one example, by having the splitter 106 create a rescue package, which may store the information previously described. The rescue package is stored on one or more of the datastores 120 and 122. Embodiments of the invention allow the appliance 130 to retrieve the rescue package directly (or using controllable splitters) and provide ways for the appliance 130 to find the rescue package. In addition, embodiments of the invention also provide for situations where the same package arrives multiple time or if communication resumes after retrieving the rescue package or while applying the rescue package.

FIG. 1B further illustrates an error situation. As previously stated, a disruption 134 may occur between the splitter 106 and the appliance 130 such that the splitter 106 becomes an uncontrollable splitter while the splitter 112 remains a controllable splitter. The virtual machine 102 is directly affected by the disruption 134. In this example, if IOs from the virtual machine 102 to the datastore 120 occur through the splitter 106, the dirty bit is set. The active bit is also set because the virtual machine 102 is active on the uncontrollable splitter 106.

If the appliance 130 is aware that the virtual machine 108 was not using or associated with the splitter 106 since the disruption 134, the associated IOs and data of the virtual machine 108 are consistent and unaffected.

In one example, the virtual machine 102 may move to the splitter 112. In this scenario, replication can then occur. However, there is still a need for the backlog of the splitter 106. The virtual machine 102 may move for various reasons. There may be a correlation between the disruption 134 and movement of the virtual machine 102. More specifically, the virtual machine 102 may be experiencing the same disruption and moving the virtual machine 102 to a different hypervisor such as the hypervisor 110 and the splitter 112 may resolve the disruption for the virtual machine 102.

In one example, it may be assumed that access to the datastores 120 and 122 remains even when there is a disruption 134 with respect to the appliance 130. If access LU to the datastores 120 and 122 is not present, then the virtual machine 102 cannot write data and the application is likely down. If both storage and communications are down or disrupted, this indicates a larger problem than an uncontrollable or unreachable splitter. Thus, the splitter 106 is likely to have access to the datastores 120 and 122 notwithstanding the disruption 134.

FIG. 2 illustrates an example of a splitter that generates a rescue package. FIG. 2 illustrates a splitter 202 that replicates data from a virtual machine or other data source to an appliance 204 (which may be virtual). In this example, a disruption 206 has been detected and, from at least the perspective of the appliance 204, the splitter 202 is an uncontrollable splitter 202.

However, the uncontrollable splitter 202 can communicate with the datastores 212 and 214. In this example, the uncontrollable splitter 202 may generate a rescue package 210 after detecting the disruption 206. The rescue package 210 includes one or more of: a splitter identifier, a timestamp or session or generation identifier of the rescue package 210 (referred to herein as a timestamp), a volume identifier per volume, a dirty bit for each volume, an active bit for each volume, and a backlog for each volume. The rescue package 210 may also include other information such as, but not limited to, volume replication parameters.

The rescue package 210 may be a file, a collection of files and may be compressed and/or encrypted. The rescue package 210 may also include an indicator for the end of data. This helps avoid a situation where the file is read before the rescue package 210 has been completed by the splitter. When processing the rescue package, the end of data indicator or mark informs the appliance 204 that all data associated with the rescue package 210 is present. In one example, the rescue package 210 may be written to a <filename>.tmp. The file may be renamed once completed. In one example, the rename operation may an atomic operation. An atomic operation ensures that there are no file partiality issues.

The splitter 202 becomes aware of or detects the disruption 206. For example, the splitter 202 may not be able to communicate with the appliance 204 or may not receive communications from the appliance 204. When the splitter 202 detects the disruption 206, the splitter may generate the rescue package 210 immediately or after a specified time period. The rescue package 210 may be generated in other situations, for example when the hypervisor is shut down, which may occur when virtual machines or hypervisors are shut down or moved.

The rescue package 210 can be stored on one or more datastores, such as the datastores 212 and 214. The package 210a represents the rescue package stored on the datastore 212 and the package 210b is the copy stored on the datastore 214. When the rescue package 210 is stored on the datastores, this can be a gradual process or a process in which multiple copies are stored at the same time.

The splitter 202 may also try to send a message. A message may be sent to other splitters (which forward the message to the appliance 204) such that the appliance 204 is made aware of the existence of the rescue package 210. Alternatively, the appliance 204 may check at predetermined locations in the datastores 212 and 214 for the rescue packages (e.g., based on filename) when the disruption 206 occurs.

As a result, there are situations where multiple uncontrollable splitters may write rescue packages to the same locations. The filename or file path for the rescue packages may distinguish between the rescue packages. For example, rescue packages may be stored at/RPRescue/<splitterID>.<timestamp>.bundle. These bundles or rescue packages can be created once, periodically, or the like.

In one example, the uncontrollable splitter 202 may generate multiple rescue packages. Each of the rescue packages may have a different backlog. The packages include volume metadata as well at least because a volume may or may not be active with respect to a particular rescue package. By creating multiple rescue packages, the size of the rescue packages can be kept to certain sizes or within a target size range.

At a certain point, the appliance 204 (or other components such as other splitters) may attempt to detect whether a package exists (e.g., is stored on a datastore) and the appliance 204 (or other splitters) may retrieve the rescue package. The controllable splitters may be able to scan for the rescue packages, retrieve the rescue packages, and forward the rescue packages to the appliance 204.

More specifically, the appliance 204 and other splitters in the computing environment can scan the datastores for the presence of rescue packages. This can be performed continually. In one example, the appliance 204 may know when the splitter 202 is uncontrollable and only scan in this situation. The appliance 204 may also know a wait time associated with the splitter 202 (the time the splitter waits before generating a rescue package when a disruption is detected). In other words, the appliance 204 may store a value indicating how long the splitter 202 will wait before creating its rescue package or before beginning the process of creating rescue packages.

After the wait time has expired, the appliance 204 can scan the datastores for the rescue package or instruct other controllable splitters to scan for the rescue package. Once the existence and location of the rescue package is known, the appliance 204 can retrieve the rescue package (download from the datastore). Alternatively, other splitters can send the rescue package to the appliance 204. The appliance 204 may then verify that the contents of the rescue package 210 are complete and intact. For example, the marker or indicator included in the rescue package indicating the end of the data should be present in the rescue package. In addition to a marker or end of file marker, the rescue package can be validated using other methods such as digital signatures, CRC (cyclic redundancy check), or the like. These methods or features ensure that partial or incomplete rescue packages are recognized and not processed. Embodiments of the invention ensure that complete rescue packages are processed in order to ensure that the replicated data is accurate.

Once the appliance 204 has received the rescue package 210, the appliance 204 begins to process the rescue package 210. As previously stated, the rescue package 210 include a dirty bit. If there are any volumes or virtual machines that are not dirty and not active, these volumes and virtual machines can immediately resume normal replication.

If there is a backlog in the rescue package and the virtual machine is no longer on the problematic hypervisor or splitter, the backlog can be synchronized from the rescue package 210 and replication can resume. A similar process may occur if the hypervisor is shut down and the splitter 202 creates a rescue package as part of the shut down process. In this case the synchronization is performed by dirtying the appliance marking stream and performing an initialization.

As opposed to a full sweep, in which the whole volume is scanned to find inconsistencies, a backlog indicates the exact areas where IOs have occurred. In other words the backlog identifies "dirty areas" as opposed to a one bit dirty disk an thus allows for a more targeted synchronization operation. Providing a backlog ensures that there is no need to scan the whole volume only the areas that are in the backlog.

There are many reasons for performing synchronization and embodiments of the invention may do more than simply synchronize the backlog. More specifically there may be other areas that require synchronization. For example, synchronization may be required from a previous package, or perhaps a previous disruption for which recovery has not completed yet, or from disruptions associated with other splitters if the virtual machine has moved to/from those splitters.

In one example, a structure (e.g., the delta marker or a marking stream) that accumulates dirtiness and defines the synch areas. When new dirty areas are found the structure is updated so that multiple synch areas are accumulated. This is referred to as "dirtifying" or "dirtying" the marking stream. If the same region in the disk is a "hotspot" e.g. written to repeatedly multiple times by possibly multiple sources the hotspot will be dirty from multiple sources. Updating the structure "flattens" all the sources and prevents the same region from being synched multiple times. This may also allow for larger continuous areas to accumulate and allow larger reads and improved synchronization performance.

If the virtual machine is still active on the uncontrollable splitter 202 or hypervisor, the backlog information can be marked as dirty in the marking stream of the appliance 204. Dirty areas cannot be retrieved because there is no access to the virtual volume data at least because this is usually accessed via the splitter 202 (otherwise, the splitter would be accessible and there would be no need for the rescue package). In this case, there is no change in the consistency group state, but the virtual machine may eventually move to another hypervisor. As a result, this information needs to be accumulated.

As previously stated, the marking stream is an example of a structure that may be used to identify areas that are dirty or that require synchronization. The marking stream may be, for example, an IO metadata stream and log. This holds a list of the metadata (location and length) of the IOs. The list may store the IOs in the order in which they arrived. This allows the dirty areas to be identified. The list can also be processed to identify adjacent areas for larger data transfers.

IN another example, a bitmap may be used. In this example, the volume may be divided into equally sized regions (e.g., 64 KB). Each bit in the bitmap may indicate whether that region is clean or dirty. The bitmap may be a fixed size in which case granularity or resolution per bit will increase with volume size. The bitmap may be fixed granularity (e.g., 64 KB per bit), in which case the bitmap will grow in size with the volume size. The better the resolution, the better the accuracy of this bitmap.

In another example, a tree structure may be used. The benefit of a tree structure, comparted to a bitmap, is that the tree is more compact. IOs tend to concentrate around common areas. The tree structure allows bits to be set around areas of activity. This keeps the per bit granularity low and accurate.

In another example, combinations of these and other similar structures can be used. In one example, a stream may be used. As the size increases, the structure may switch to a bitmap or tree. This may lose resolution while managing size of the marking stream or other marking structure.

Another aspect of processing the rescue package 210 relates to tracking the timestamp. Tracking the timestamp ensures idempotency. Once the rescue package 210 is processed and its contents are processed, the rescue package 210 should be marked and not processed again. Because the rescue package 210 may be stored in multiple locations, the rescue package 210 may be retrieved multiple times (e.g., by multiple splitters or by multiple appliances). Further, communications with the uncontrollable splitter may resume. Thus, the knowledge of what has been processed by the appliance 204 needs to be tracked and needs to be clear. Using the timestamp of the rescue package 210, the appliance 204 understands the time or IOs that have been processed. Rescue packages with older timestamps can then be ignored. Other instances of the same rescue package can also be ignored.

In a case where there are multiple uncontrollable splitters, it is necessary to track and ensure that all rescue packages up to time T were retrieved from all of the uncontrollable splitters before releasing that timestamp. In one example, the rescue package can be used to dirtify the marking stream, which is stored in the consistency group journal. This ensures correct handling of multiple appliances and multiple occurrences.

Once a rescue package has been retrieved and accepted by the appliance 204, the rescue package can be deleted from the datastores. Further all instances of the rescue package with the same package identifier can be deleted. The uncontrollable splitter can interpret the deletion of a rescue package as an implicit acknowledgement that the rescue package has been received. To further avoid errors (e.g., the manual deletion of a rescue package), an acknowledgement file can be created (e.g., /RPRescue/<splitterid>.<timestamp>.ack), for example after the rescue package is retrieved or after the rescue package is successfully processed. When the splitter sees the acknowledgment file, the splitter understands that the rescue package has been delivered and the acknowledgment file can be deleted.

Using an acknowledgement file allows the splitter to know that the rescue package has been received (e.g., by scanning the location for the acknowledgment file) by the appliance and that there is no further need to keep attempting to contact the appliance or to store additional copies of the rescue package. For example, if the splitter is storing the rescue package on multiple datastores one at a time, the splitter can cease this activity.

The acknowledgement file also allows the splitter to know the location from which the rescue package was successfully retrieved. A subsequent rescue package could then be stored at that location first for example. The appliance and the splitters can further optimize the process of searching or scanning for rescue packages by scanning the last locations that were acknowledged. The uncontrollable splitter can prioritize that locations at which rescue packages are stored and prioritize the order in which the rescue packages are stored in the datastores.

Figure 3:
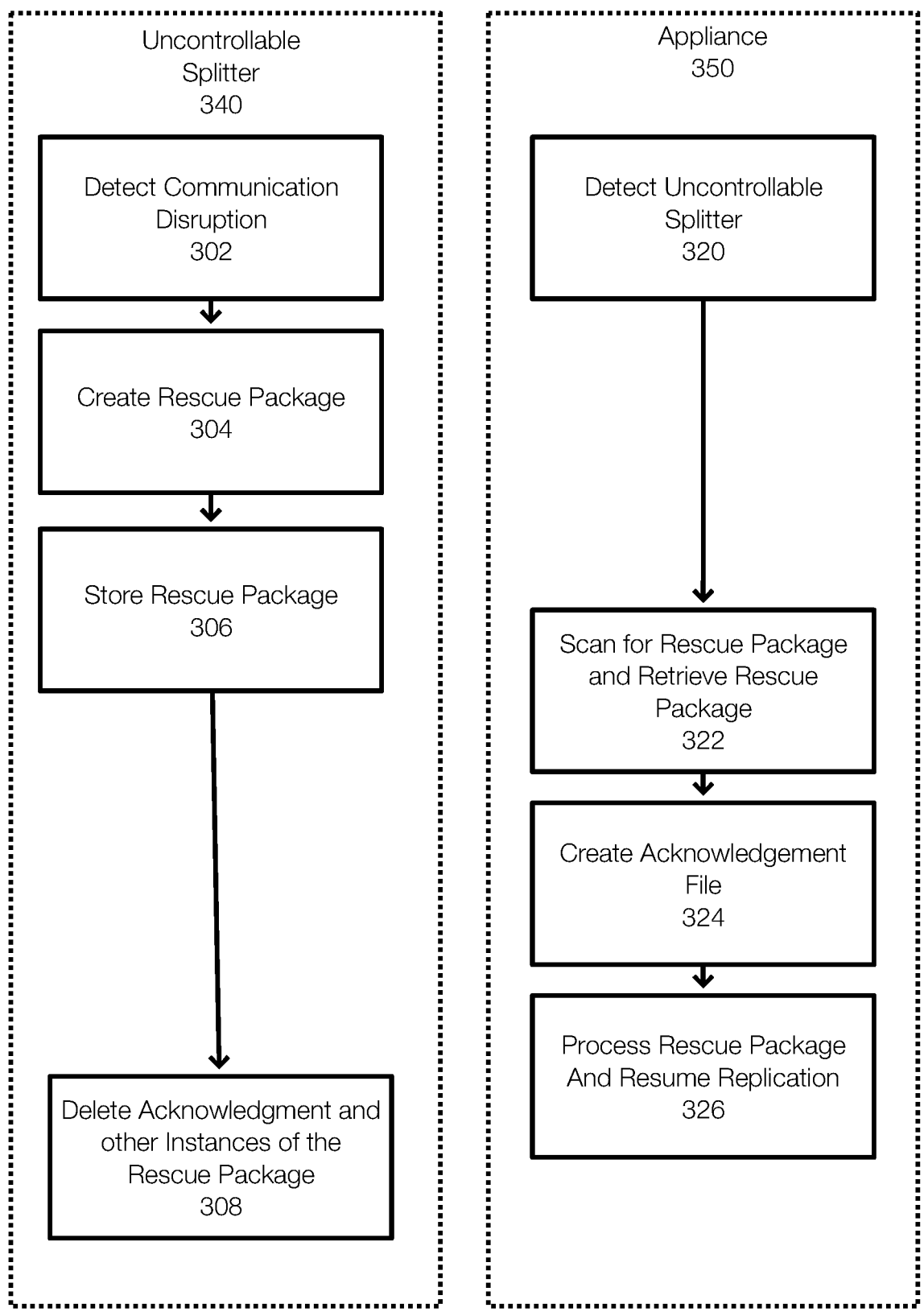
FIG. 3 illustrates an example of a method for performing a replication operation in the context of a communication disruption.

FIG. 3 illustrates an example of a method for performing a data protection operation such as replicating data when an uncontrollable splitter is present in a computing or data protection system or when a communication disruption is detected in a computing system or in a data protection system. FIG. 3 illustrates the method from the perspective of an uncontrollable splitter 340 and an appliance 350. In one example, the uncontrollable splitter 340 and the appliance 350 are part of the same data protection system and may be deployed in various configurations and locations in a computing network. A data protection system may include multiple splitters and multiple appliances.

In one example, an uncontrollable splitter 340 is a splitter that has lost communication with an appliance. However, the uncontrollable splitter 340 may still be able to perform functions such as create a rescue package that allows the replication process to recover from a communication disruption without performing a full sweep of the volumes being replicated by the data protection system.

As shown in FIG. 3, the uncontrollable splitter 340 may detect 302 a communication disruption. The communication disruption may be detected when communications are not received from the appliance 350 or in other ways. At about the same time, the appliance 350 may detect that the splitter is uncontrollable or, in other words, understand that the splitter 340 is uncontrollable at least in the sense that the appliance 350 cannot communicate or send instructions to the splitter 340. As previously stated, the splitter 340 may continue to operate (e.g., the splitter 340 can communicate with the datastores).

Once the uncontrollable splitter is detected by the appliance 350, the appliance 350 may wait a time T (this gives the splitter time to create and store a rescue package). At the same time, the splitter 340 may wait a certain amount of time before creating the rescue package. After waiting for a certain time and, in one example if the communication disruption is not resolved, the splitter 340 creates 304 the rescue package and stores 306 the rescue package on one or more datastores. The rescue package (e.g., a bundle) may be placed on multiple datastores at the same time, in succession, or in another manner.

After waiting for a predetermined time in one embodiment, the appliance 350 may scan the datastores for the rescue package and retrieve 322 the rescue package. In one example, the appliance 350 may look at locations that were previously determined or that were recently used. Further, the rescue packages may follow a naming convention that allows the rescue package to be identified. The rescue packages may also use a timestamp to ensure idempotency. The appliance 350 may alternatively or in addition instruct other controllable splitters to scan the datastores for the rescue package(s) of the uncontrollable splitter. In this case, the controllable splitters may retrieve and send the rescue packages to the appliance 350.

The controllable splitters (or the appliance or based on an instruction from the appliance) may create 324 an acknowledgment file 324 in the same location from which the rescue package was retrieved. The appliance 350 processes the rescue package and resumes replication 326 on all volumes on which replication can be resumed.

The uncontrollable splitter 340 may see and delete the acknowledgment 308. The uncontrollable splitter may also delete other instances of the rescue package that has been processed by the appliance 350.

By creating a rescue package and placing it in a location with high probability of being retrieved, we have created a way to alleviate some of the issues created by an uncontrollable splitter. The solution is efficient and will avoid full sweeps of the volumes in many cases.

Embodiments of the invention thus relate to data protection operations and relate to a protocol for performing replication when communication is disrupted. The protocol relates to the rescue package, how to store and retrieve the rescue package, how to handle idempotency and how to acknowledge the processed rescue package. This protocol, in many instances, can alleviate the issues created by an uncontrollable splitter and can also help avoid full sweeps.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in backup platforms, examples of which include the Dell-EMC NetWorker and Avamar platforms and associated backup software, and storage environments such as the Dell-EMC DataDomain storage environment. Examples also include DELL-EMC RecoveryPoint and PR4VM systems. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method for performing a data protection operation, the method comprising: detecting a communication disruption that prevents a splitter from communicating with an appliance that stores data replicated from a source, creating a rescue package, wherein the rescue package includes a backlog that includes IOs associated with the splitter, storing the rescue package at a location in a datastore;

retrieving the rescue package from the location, and processing the rescue package by the appliance such that the backlog is incorporated into the replicated data.

Embodiment 2. The method of embodiment 1, further comprising the splitter waiting a time period before creating the rescue package.

Embodiment 3. The method of embodiment 1 and/or 2, further comprising the appliance waiting the time period before looking for the rescue package.

Embodiment 4. The method of embodiment 1, 2, and/or 3, further comprising generating multiple rescue packages, each rescue package associated with a timestamp.

Embodiment 5. The method of embodiment 1, 2, 3, and/or 4, wherein the rescue package include an indicator for an end of data such that, when processed, the appliance knows that the rescue package is complete.

Embodiment 6. The method of embodiment 1, 2, 3, 4, and/or 5, further comprising writing an acknowledgment file to the location after retrieving the rescue package.

Embodiment 7. The method of embodiment 1, 2, 3, 4, 5, and/or 6, further comprising prioritizing the location for subsequent rescue packages.

Embodiment 8. The method of embodiment 1, 2, 3, 4, 5, 6, and/or 7, further comprising deleting the acknowledgement file and other instances of the rescue package when the acknowledgment file is recognized.

Embodiment 9. The method of embodiment 1, 2, 3, 4, 5, 6, 7, and/or 8, further comprising resuming replication when the rescue package is successfully processed.

Embodiment 10. The method of embodiment 1, 2, 3, 4, 5, 6, 7, 8, and/or 9, wherein the rescue package includes: a dirty bit indicating that a volume has IOS that the appliance is unaware of, an active bit indicating whether an entity is active on the splitter; and the backlog.

Embodiment 11. The method of embodiment 1, 2, 3, 4, 5, 6, 7, 8, 9, and/or 10, further comprising storing the rescue package in multiple datastores sequentially or at different times or at the same time.

Embodiment 12. A method for performing any of the operations, methods, or processes, or any portion of any of these, disclosed herein.

Embodiment 13. A non-transitory storage medium having stored therein instructions that are executable by one or more hardware processors to perform the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device or system. As well, where any of the aforementioned elements comprise or consist of a virtual machine (VM), that VM may constitute a virtualization of any combination of the physical components disclosed herein.

The physical computing device or system includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to data protection operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a data protection operation, the method comprising:
   detecting a communication disruption that prevents a splitter from communicating with an appliance that stores data replicated from a source;
   creating a rescue package, wherein the rescue package includes a backlog that includes IOs associated with the splitter;
   storing the rescue package at a location in a datastore;
   retrieving the rescue package from the location;
   writing an acknowledgement file to the location after retrieving the rescue package; and
   processing the rescue package by the appliance such that the backlog is incorporated into the replicated data.

2. The method of claim 1, further comprising the splitter waiting a time period before creating the rescue package.

3. The method of claim 2, further comprising the appliance waiting the time period before looking for the rescue package.

4. The method of claim 1, further comprising generating multiple rescue packages, each rescue package associated with a timestamp.

5. The method of claim 1, wherein the rescue package includes an indicator for an end of data such that, when processed, the appliance knows that the rescue package is complete or wherein completeness of the rescue package is determined using a digital signature or cyclic redundancy check.

6. The method of claim 1, further comprising prioritizing the location for subsequent rescue packages.

7. The method of claim 1, further comprising deleting the acknowledgement file and other instances of the rescue package when the acknowledgment file is recognized.

8. The method of claim 1, further comprising resuming replication when the rescue package is successfully processed.

9. The method of claim 1, wherein the rescue package includes:
   a dirty bit indicating that a volume has IOS that the appliance is unaware of;
   an active bit indicating whether an entity is active on the splitter; and
   the backlog.

10. The method of claim 1, further comprising storing the rescue package in multiple datastores sequentially or at different times or at the same time.

11. A non-transitory storage medium having stored therein instructions that are executable by one or more hardware processors to perform operations comprising:
    detecting a communication disruption that prevents a splitter from communicating with an appliance that stores data replicated from a source;
    creating a rescue package, wherein the rescue package includes a backlog that includes IOs associated with the splitter;
    storing the rescue package at a location in a datastore;
    retrieving the rescue package from the location;
    writing an acknowledgement file to the location after retrieving the rescue package; and
    processing the rescue package by the appliance such that the backlog is incorporated into the replicated data.

12. The non-transitory storage medium of claim 11, the operations further comprising the splitter waiting a time period before creating the rescue package and storing the rescue package in multiple datastores at the same time or sequentially.

13. The non-transitory storage medium of claim 12, the operations further comprising the appliance waiting the time period before looking for the rescue package.

14. The non-transitory storage medium of claim 11, the operations further comprising generating multiple rescue packages, each rescue package associated with a timestamp.

15. The non-transitory storage medium of claim 11, wherein the rescue package include an indicator for an end of data such that, when processed, the appliance knows that the rescue package is complete, the operations further comprising resuming replication when the rescue package is processed and the backlog is incorporated into the replicated data.

16. The non-transitory storage medium of claim 11, the operations further comprising prioritizing the location for subsequent rescue packages.

17. The non-transitory storage medium of claim 11, the operations further comprising deleting the acknowledgement file and other instances of the rescue package when the acknowledgment file is recognized.

18. The non-transitory storage medium of claim 11, wherein the rescue package includes:
    a dirty bit indicating that a volume has IOS that the appliance is unaware of;
    an active bit indicating whether an entity is active on the splitter; and
    the backlog.

* * * * *